United States Patent
Ijima (10) Patent No.: US 11,915,688 B2
(45) Date of Patent: Feb. 27, 2024

(54) PREDICTION DEVICE, PREDICTION METHOD, AND PROGRAM

(71) Applicant: NIPPON TELEGRAPH AND TELEPHONE CORPORATION, Tokyo (JP)

(72) Inventor: Yusuke Ijima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 234 days.

(21) Appl. No.: 17/429,617

(22) PCT Filed: Jan. 30, 2020

(86) PCT No.: PCT/JP2020/003480
§ 371 (c)(1),
(2) Date: Aug. 9, 2021

(87) PCT Pub. No.: WO2020/166359
PCT Pub. Date: Aug. 20, 2020

(65) Prior Publication Data
US 2022/0139381 A1 May 5, 2022

(30) Foreign Application Priority Data
Feb. 12, 2019 (JP) ................................ 2019-022596

(51) Int. Cl.
*G10L 15/16* (2006.01)
*G10L 15/197* (2013.01)
(Continued)

(52) U.S. Cl.
CPC ............ *G10L 15/16* (2013.01); *G10L 15/197* (2013.01); *G10L 15/22* (2013.01); *G10L 25/18* (2013.01); *G10L 25/30* (2013.01)

(58) Field of Classification Search
CPC ......... G10L 15/16; G10L 25/18; G10L 25/30; G10L 15/22; G10L 15/197
(Continued)

(56) References Cited

U.S. PATENT DOCUMENTS

| 9,697,820 B2 * | 7/2017 | Jeon ...................... G10L 13/047 |
| 2018/0046614 A1 * | 2/2018 | Ushio .................... G06N 3/044 |
| 2021/0183378 A1 * | 6/2021 | Gharpure ............... G10L 15/02 |

FOREIGN PATENT DOCUMENTS

JP     2000310996 A    11/2000

OTHER PUBLICATIONS

Douglas O'Shaughnessy, "Automatic Speech Recognition," in Speech Communications: Human and Machine, IEEE, 2000, pp. 367-435, doi: 10.1109/9780470546475.ch10. (Year: 2000).*

(Continued)

*Primary Examiner* — Bharatkumar S Shah (57) ABSTRACT

An estimation device (100), which is an estimation device that estimates a duration of a speech section, includes: a representation conversion unit (11) that performs representation conversion of a plurality of words included in learning utterance information to a plurality of pieces of numeric representation data; an estimation data generation unit (12) that generates estimation data by using a plurality of pieces of the learning utterance information and the plurality of pieces of numeric representation data; an estimation model learning unit (13) that learns an estimation model by using the estimation data and the durations of the plurality of words; and an estimation unit (20) that estimates the duration of a predetermined speech section based on utterance information of a user by using the estimation model.

18 Claims, 4 Drawing Sheets

(51) Int. Cl.
*G10L 15/22* (2006.01)
*G10L 25/18* (2013.01)
*G10L 25/30* (2013.01)

(58) Field of Classification Search
USPC ............................................ 704/9
See application file for complete search history.

(56) References Cited

OTHER PUBLICATIONS

Ouglas O'Shaughnessy, "Automatic Speech Recognition," in Speech Communications: Human and Machine, IEEE, 2000, pp. 367-435, doi: 10.1109/9780470546475.ch10. (Year: 2000) (Year: 2000).*

R. Zazo, P. Sankar Nidadavolu, N. Chen, J. Gonzalez-Rodriguez and N. Dehak, "Age Estimation in Short Speech Utterances Based on LSTM Recurrent Neural Networks," in IEEE Access, vol. 6, pp. 22524-22530, 2018, doi: 10.1109/ACCESS.2018.2816163. (Year: 2018).*

Tsiakoulis et al. (2014) "Dialogue context sensitive HMM-based speech synthesis" 2014 IEEE International Conference on Acoustics, Speech and Signal Processing (ICASSP), May 4, 2014.

Hojo et al. (2016) "Examination of speech synthesis that can express dialogue action information" The 30th Annual Conference of the Japanese Society for Artificial Intelligence, Jun. 6, 2016.

Maeno et al. (2014) "Prosodic variation enhancement using unsupervised context labeling for HMM-based expressive speech synthesis" Science Direct, Speech Communication, Elsevier, vol. 57, No. 3, pp. 144-154.

Mikolov et al. (2013) "Efficient Estimation of Word Representations in Vector Space" International Conference on Learning Representations (ICLR), May 2, 2013.

* cited by examiner

Fig. 4

| WORD | START TIME [ms] | END TIME [ms] |
|---|---|---|
| KYOU (TODAY) | 0 | 350 |
| NO [PARTICLE] | 350 | 600 |
| TENKI (WEATHER) | 600 | 680 |
| WA [PARTICLE] | 680 | 830 |
| ⋮ | ⋮ | ⋮ |

PREDICTION DEVICE, PREDICTION METHOD, AND PROGRAM

CROSS-REFERENCE TO RELATED APPLICATIONS

This application is a U.S. 371 Application of International Patent Application No. PCT/JP2020/003480, filed on 30 Jan. 2020, which application claims priority to and the benefit of JP Application No. 2019-022596, filed on 12 Feb. 2019, the disclosures of which are hereby incorporated herein by reference in their entireties.

TECHNICAL FIELD

The present invention relates to an estimation device, an estimation method, and a program for estimating the duration of a speech section.

BACKGROUND ART

For example, in order to realize a natural dialogue with a user in a spoken dialogue system, development of a technique for enhancing the quality of synthetic speech is underway. One of the underlying technologies for generating synthetic speech is a technology for estimating the duration of a speech section (for example, phoneme, mora, phrase, or word) based on information such as text.

For example, in Non-Patent Literature 1 and Non-Patent Literature 2, tag information such as dialogue act information (information corresponding to a user's intention) is added to one sentence that is a synthetic speech generation target and based on the tag information, the duration of a speech section is estimated. For example, in Non-Patent Literature 3, the duration of a predetermined speech section is manually changed.

CITATION LIST

Non-Patent Literature

Non-Patent Literature 1: Tsiakoulis, Pirros, et al. "Dialogue context sensitive HMM-based speech synthesis." Acoustics, Speech and Signal Processing (ICASSP), 2014 IEEE International Conference on. IEEE, 2014.

Non-Patent Literature 2: Nobukatsu Hojo, Yusuke Ijima, Hiroaki Sugiyama. "Speech Synthesis Allowing Representation of Dialogue-Act Information," The Annual Conference of the Japanese Society for Artificial Intelligence, 204-OS-23a-4, June 2016.

Non-Patent Literature 3: Yu Maeno, Takashi Nose, Takao Kobayashi, Tomoki Koriyama, Yusuke Ijima, Hideharu Nakajima, Hideyuki Mizuno, Osamu Yoshioka. "Prosodic Variation Enhancement Using Unsupervised Context Labeling for HMM-based Expressive Speech Synthesis," Speech Communication, Elsevier, Vol. 57, No. 3, pp. 144-154, February 2014.

Non-Patent Literature 4: Tomas Mikolov, Kai Chen, Greg Corrado, Jeffrey Dean, "Efficient estimation of word representations in vector space," 2013, ICLR.

SUMMARY OF THE INVENTION

Technical Problem

However, in the conventional techniques, it is difficult to estimate the duration of a predetermined speech section with high accuracy. Therefore, for example, the spoken dialogue system has a problem that the quality of generated synthetic speech is low, thereby making it difficult to realize a natural dialogue with a user.

The object of the present invention that has been made in view of the above problems is to provide an estimation device, an estimation method, and a program for estimating the duration of a predetermined speech section with high accuracy.

Means for Solving the Problem

In order to solve the above problems, an estimation device of the present invention, which estimates the duration of a speech section, includes: a representation conversion unit that performs representation conversion of a plurality of words included in learning utterance information to a plurality of pieces of numeric representation data; an estimation data generation unit that generates estimation data by using a plurality of pieces of the learning utterance information and the plurality of pieces of numeric representation data; an estimation model learning unit that learns an estimation model by using the estimation data and the durations of the plurality of words; and an estimation unit that estimates the duration of a predetermined speech section based on utterance information of a user by using the estimation model.

In addition, in order to solve the above problems, an estimation method of the present invention, which is an estimation method by an estimation device that estimates the duration of a speech section, includes the steps of: performing representation conversion of a plurality of words included in learning utterance information to a plurality of pieces of numeric representation data; generating estimation data by using a plurality of pieces of the learning utterance information and the plurality of pieces of numeric representation data; learning an estimation model by using the estimation data and the durations of the plurality of words; and estimating the duration of a predetermined speech section based on utterance information of a user by using the estimation model.

In addition, in order to solve the above problems, a program of the present invention causes a computer to function as the above estimation device.

Effects of the Invention

According to the present invention, it is possible to estimate the duration of a predetermined speech section with high accuracy.

DESCRIPTION OF EMBODIMENTS

Hereinafter, embodiments of the present invention will be described in detail with reference to drawings.

First Embodiment

With reference to FIG. 1 to FIG. 4, a configuration of an estimation device 100 and an estimation method according to an embodiment will be described.

Figure 1:
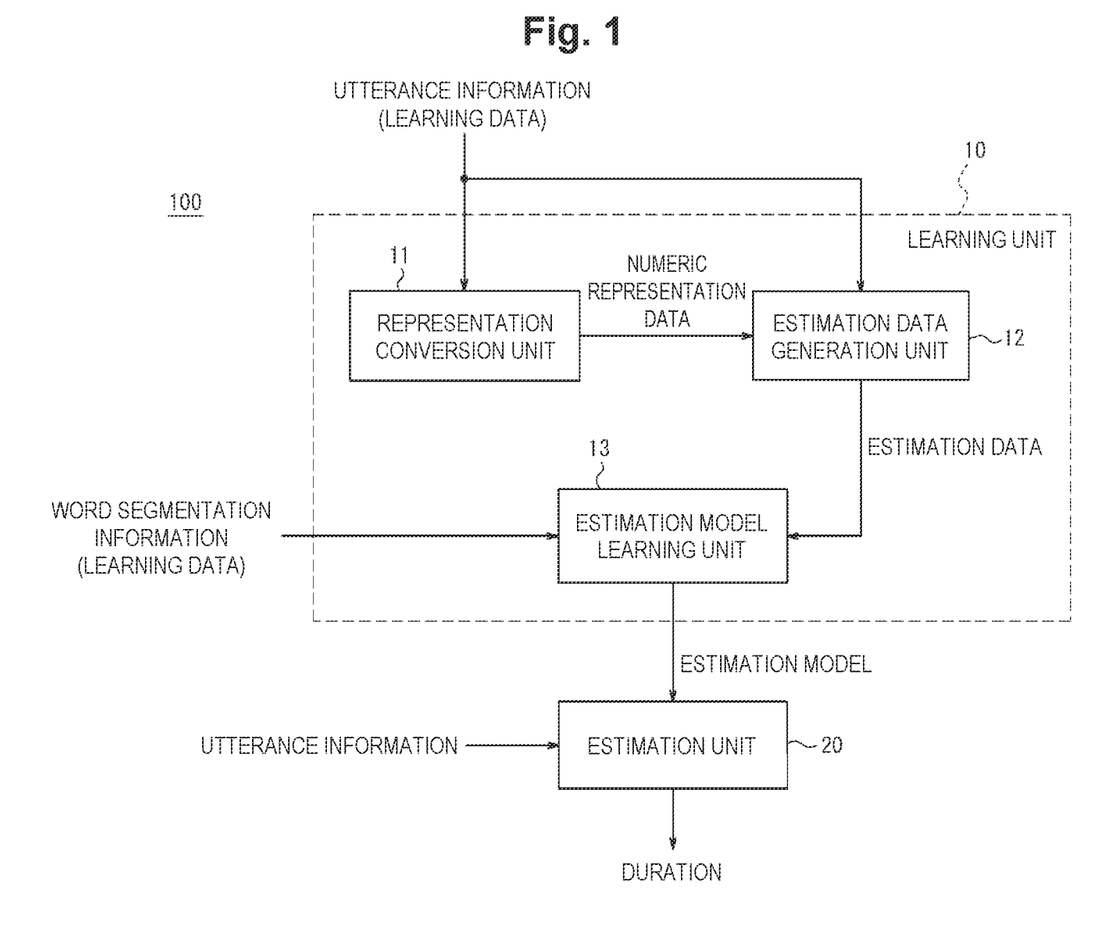
FIG. 1 is a diagram showing one example of a configuration of an estimation device according to an embodiment.

As shown in FIG. 1, the estimation device 100 includes a learning unit 10 and an estimation unit 20. The learning unit 10 includes a representation conversion unit 11, an estimation data generation unit 12, and an estimation model learning unit 13.

The estimation device 100 is, for example, a device configured by reading a predetermined program into a known or dedicated computer that includes a central processing unit (CPU), a main memory (Random Access Memory: RAM) and the like. The estimation device 100 executes processing steps under control of the central processing unit, for example. Data input into the estimation device 100 and data obtained by the processing steps are stored, for example, in the main memory; and the data stored in the main memory is read to the central processing unit as required so as to be used for other processing. At least part of the processing units of the estimation device 100 may be configured by hardware such as an integrated circuit. Each storage unit included in the estimation device 100 may be configured, for example, by a main memory such as RAM or middleware such as relational database or key-value store. However, each storage unit is not necessarily required to be included inside the estimation device 100 but it may be configured so as to be provided outside the estimation device 100 by being configured by an auxiliary storage device configured by a hard disk or an optical disk, or by a semiconductor memory device such as flash memory.

The estimation device 100 estimates the duration of a predetermined speech section (for example, an important word included in one sentence that is a synthetic speech generation target) based on utterance information of a user (for example, a dialogue partner of the spoken dialogue system) by using an estimation model. The estimation model is a neural network that converts data (for example, a vector) constructed from learning data (for example, learning speech data, learning utterance information) to an estimated speech section duration. As a neural network, for example, MLP (Multilayer perceptron), RNN (Recurrent Neural Network), RNN-LSTM (Recurrent Neural Network-Long Short Term Memory), or CNN (Convolutional Neural Network) is used. Speech sections include, for example, a word, a phoneme, a mora, a phrase, and the like; however, herein, description is made by using, as an example, a case in which a "word" is adopted as a speech section.

Speech data is data including a plurality of utterances, the order of a plurality of utterances. The speech data may be, for example, an acoustic feature amount that includes a pitch parameter such as a fundamental frequency, a spectrum parameter such as cepstrum or mel-cepstrum, or the like.

Figure 3:
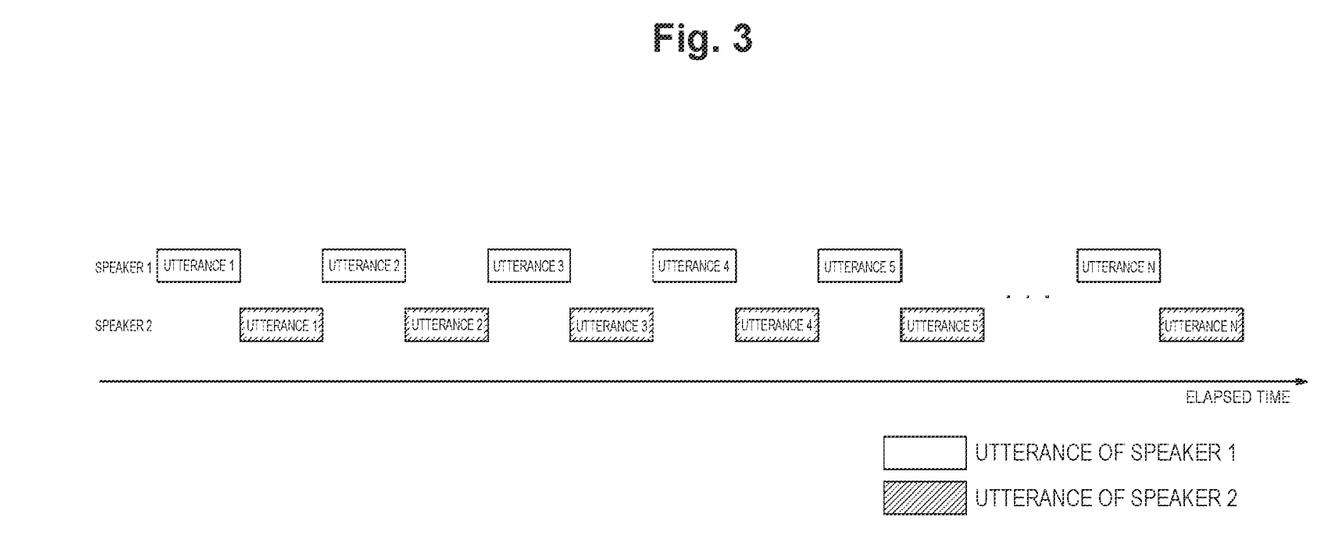
FIG. 3 is a diagram showing one example of speech data according to the embodiment.

FIG. 3 is a diagram showing one example of the speech data. As shown in FIG. 3, the speech data includes, for example, the utterance 1 to utterance N of a speaker 1, the utterance 1 to utterance N of a speaker 2, and the order of the utterance 1 to utterance N of the speaker 1 and the utterance 1 to utterance N of the speaker 2.

The utterance information is information on utterances (for example, utterance 1: "kyou no tenki wa?(How's the weather today?)") included in the speech data; and is information that includes, for example: a word included in an utterance (for example, the third word included in the utterance 1: "tenki (weather)"); the utterance start time and utterance end time of a word included in an utterance; phonemes included in an utterance; morae included in an utterance; phrases included in an utterance; speech related to an utterance; and sentences related to an utterance.

Figure 4:
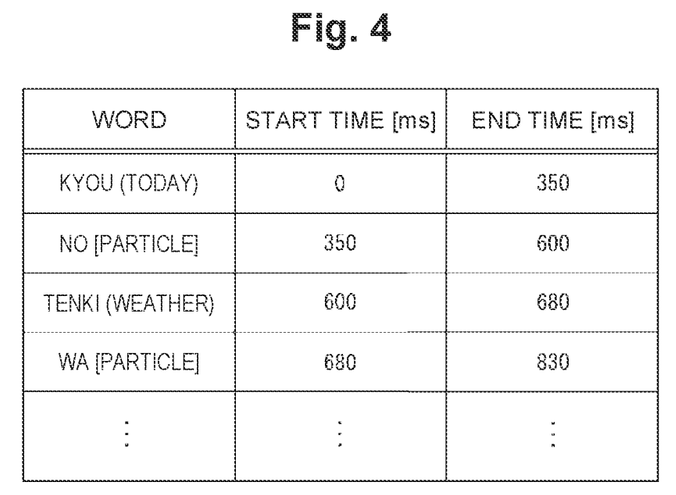
FIG. 4 is a chart showing one example of word segmentation information according to the embodiment.

FIG. 4 is a chart showing one example of information (word segmentation information) on the utterance start time and utterance end time of each of words included in an utterance. As shown in FIG. 4, in the case of a word of "kyou (today)" for example, the word segmentation information shows that the utterance start time is 0 [ms] and the utterance end time is 350 [ms]. In addition, in the case of a word of "no [particle]" for example, the word segmentation information shows that the utterance start time is 350 [ms] and the utterance end time is 600 [ms]. In the case of a word of "tenki (weather)" for example, the word segmentation information shows that the utterance start time is 600 [ms] and the utterance end time is 680 [Ins]. In the case of a word of "wa [particle]" for example, the word segmentation information shows that the utterance start time is 680 [ms] and the utterance end time is 830 [ms]. Note that the word segmentation information may be manually added or may be automatically added by using a speech recognizer or the like.

Hereinafter, details of each of the units will be described.

Figure 2:
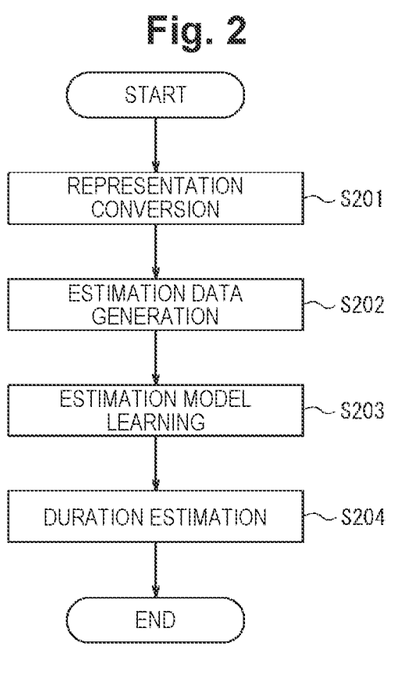
FIG. 2 is a flow chart showing one example of an estimation method according to the embodiment.

The representation conversion unit 11 performs representation conversion of a plurality of words included in learning utterance information to a plurality of pieces of numeric representation data (see step S201 shown in FIG. 2). The representation conversion unit 11 outputs the plurality of pieces of numeric representation data obtained by representation conversion, to the estimation data generation unit 12.

For example, the representation conversion unit 11 performs representation conversion of the plurality of words included in the learning utterance information to a plurality of vectors $w_{sn}(t)$ by using a word-vector conversion model in Word2Vec (for example, see the Non-Patent Literature 4). The vector $w_{sn}(t)$ represents a vector which is obtained by performing representation conversion of the t-th ($1 \leq t \leq T_{sn}$) word included in the n-th ($1 \leq n \leq N$) utterance of a speaker s ($1 \leq s \leq 2$). N represents the number of utterances, $T_{sn}$ represents the number of words included in the n-th utterance of the speaker s. For example, the vector $w_{11}(t)$ represents a vector obtained by performing representation conversion of the t-th word included in the first utterance 1 of a speaker 1. For example, the vector $w_{22}(t)$ represents a vector obtained by performing representation conversion of the t-th word included in the utterance 2 of a speaker 2.

The estimation data generation unit 12 generates estimation data by using a plurality of pieces of the learning utterance information and the plurality of pieces of numeric representation data which is input from the representation conversion unit 11 (see step S202 shown in FIG. 2). The estimation data generation unit 12 outputs the generated estimation data to the estimation model learning unit 13.

Specifically, the estimation data generation unit 12 obtains a vector $vp_{sn}(t)$ (first data) of past utterances by using a plurality of vectors obtained by performing representation conversion of a plurality of words which are included in learning utterance information of utterances (for example, the utterance 1 to utterance 5 of the speaker 1, the utterance 1 to utterance 4 of the speaker 2) prior to an estimation target utterance (for example, the utterance 5 of the speaker 2). The vector $vp_{sn}(t)$ represents a vector of the n-th ($1 \leq n \leq N$) utterance of a speaker s ($1 \leq s \leq 2$). For example, the estimation data generation unit 12 obtains a vector of past utterances by using statistics (average, distribution, and the like) of a plurality of vectors obtained by performing representation conversion of all of a plurality of words which are included in learning utterance information of an utterance (for example, the utterance 5 of the speaker 1) immediately before an estimation target utterance (for example, the utterance 5 of the speaker 2).

Note that the estimation data generation unit 12 can freely select a past utterance to obtain a vector of the past utterances. For example, the estimation data generation unit 12 may select only an utterance immediately before an estimation target utterance, thereby obtaining a vector of the past utterances. For example, the estimation data generation unit 12 may select a plurality of past utterances that are close in terms of time to an estimation target utterance, thereby obtaining a vector of the past utterances. For example, the estimation data generation unit 12 may select all of utterances prior to an estimation target utterance, thereby obtaining a vector of the past utterances.

In addition, the estimation data generation unit 12 obtains a vector $vc_{sn}(t)$ (second data) of an estimation target utterance (for example, the utterance 5 of the speaker 2), by using a vector obtained by performing representation conversion of an estimation target word (for example, the third word included in the utterance 5 of the speaker 2) which is included in learning utterance information of the estimation target utterance. The vector $vc_{sn}(t)$ represents a vector of the n-th ($1 \leq n \leq N$) utterance of the speaker s ($1 \leq s \leq 2$).

Note that the estimation data generation unit 12 may obtain a vector of an estimation target utterance (for example, the utterance 5 of the speaker 2), by using duration information such as phonemes included in an estimation target word or morae included in an estimation target word in addition to a vector obtained by performing representation conversion of an estimation target word which is included in the learning utterance information of the estimation target utterance.

In addition, the estimation data generation unit 12 concatenates the vector $vp_{sn}(t)$ of the past utterances and the vector $vc_{sn}(t)$ of the estimation target utterance, thereby generating an estimation vector $v_{sn}(t)$. The vector $v_{sn}(t)$ represents a vector for estimating a duration of the t-th ($1 \leq t \leq T_{sn}$) word included in the n-th ($1 \leq n \leq N$) utterance of the speaker s ($1 \leq s \leq 2$).

The estimation data generation unit 12 generates the estimation vector $v_{sn}(t)$ with not only the vector $vc_{sn}(t)$ of the estimation target utterance but also the vector $vp_{sn}(t)$ of the past utterances included, thereby enhancing an estimation accuracy of the duration of an estimation target word.

The estimation model learning unit 13 learns an estimation model by using the estimation data and the duration of a plurality of words included in the learning utterance information (see step S203 shown in FIG. 2). For example, the estimation model learning unit 13 learns an estimation model by using the estimation vector $v_{sn}(t)$, which is obtained by concatenating the vector $vp_{sn}(t)$ of past utterances and the vector $vc_{sn}(t)$ of an estimation target utterance, and the word segmentation information (see FIG. 4). The estimation model can be represented by the following expression (1) for example.

[Math. 1]

$$\hat{d}_{sn}(t) = f_{v \to d}(v_{sn}(t)) \quad (1)$$

where d represents the duration of a word, and
$\hat{d}$ represents the estimated duration of a word.

The estimation model is, for example, a neural network such as Multilayer perceptron, Recurrent Neural Network, Recurrent Neural Network-Long Short Term Memory, or Convolutional Neural Network, or a neural network obtained by combining some of them. For example, when the estimation model is a neural network considering a time series, such as Recurrent Neural Network or Recurrent Neural Network-Long Short Term Memory, the estimation model learning unit 13 easily performs learning in consideration of past utterances and therefore, the estimation accuracy of the duration of an estimation target word can be enhanced.

The estimation model learning unit 13 obtains the duration lengths d of a plurality of words included in the learning utterance information based on the word segmentation information as shown in FIG. 4, for example. For example, in the case of a word of "kyou (today)," the duration d of "kyou (today)" is 350 [ms]. In addition, for example, in the case of a word of "no [particle]," the duration d of "no [particle]" is 250 [ms]. Furthermore, for example, in the case of a word of "tenki (weather)," the duration d of "tenki (weather)" is 80 [ms]. Still furthermore, for example, in the case of a word of "wa [particle]," the duration d of "wa [particle]" is 150 [ms].

The estimation unit 20 estimates the duration of a predetermined word based on the utterance information of a user by using the estimation model learned by the learning unit 10 (see step S204 shown in FIG. 2.) Then, the estimation unit 20 outputs the estimated duration of the predetermined word to a speech synthesis unit (not illustrated). The predetermined word is only required to be a word included in one sentence that is a synthetic speech generation target when the speech synthesis unit generates synthetic speech; it is, for example, an important word, a repeated word or the like. Note that the configuration of the speech synthesis unit is not particularly limited.

According to the estimation device 100 of the first embodiment, the duration of a predetermined speech section is estimated based on the utterance information of a user by using the estimation model. This makes it possible to estimate the duration of a predetermined speech section with high accuracy.

In addition, according to the estimation device 100 of the first embodiment, the estimation data generation unit 12 generates estimation data in consideration of past utterances, and the like. This makes it possible to estimate the duration of a predetermined speech section with high accuracy also for an event such as readback in which important information is repeated.

Furthermore, by applying the estimation device 100 of the first embodiment to a spoken dialogue system, such synthetic speech (high-quality synthetic speech) having an appropriate speech section duration can be generated, as synthetic speech in which an important word is emphasized and synthetic speech in which the utterance speed of an important word is slowed, for example. This makes it possible to realize a spoken dialogue system in which a natural dialogue with a user is performed in real time and naturalness of speech dialogues is improved.

Second Embodiment

Next, an estimation device 100A according to a second embodiment will be described.

A point in which the estimation device 100A according to the second embodiment is different from the estimation device 100 according to the first embodiment is that: the estimation data generation unit 12 in the estimation device 100 according to the first embodiment obtains a vector of past utterances by using a plurality of pieces of numeric representation data which is obtained by performing representation conversion of all of a plurality of words included in learning utterance information of the past utterances; while an estimation data generation unit 12A in the estimation device 100A according to the second embodiment selects optimal numeric representation data from among a plurality of pieces of numeric representation data which are obtained by performing representation conversion of all of a plurality of words included in learning utterance information of past utterances, and obtains a vector of the past utterances by using the selected numeric representation data. Note that the other configurations are the same as those for the estimation device 100 according to the first embodiment and therefore, redundant explanation will be omitted.

The estimation data generation unit 12A generates estimation data by using a plurality of pieces of learning utterance information and a plurality of pieces of numeric representation data which is input from the representation conversion unit 11. The estimation data generation unit 12A outputs the generated estimation data to the estimation model learning unit 13.

Specifically, the estimation data generation unit 12A obtains a vector $vp_{sn}(t)$ (first data) of past utterances by using a plurality of vectors obtained by performing representation conversion of a plurality of words which are included in learning utterance information of utterances (for example, the utterance 1 to the utterance 5 of the speaker 1, the utterance 1 to utterance 4 of the speaker 2) prior to an estimation target utterance (for example, the utterance 5 of the speaker 2). For example, the estimation data generation unit 12A selects a vector that is the most similar to a vector obtained by performing representation conversion of an estimation target word (for example, the third word included in the utterance 5 of the speaker 2) from among a plurality of vectors obtained by performing representation conversion of all of a plurality of words which are included in learning utterance information of an utterance (for example, the utterance 5 of the speaker 1) immediately before an estimation target utterance (for example, the utterance 5 of the speaker 2). The estimation data generation unit 12A obtains a vector of the past utterances by using the selected vector. The vector $vp_{sn}(t)$ of the past utterances can be represented by the following expression (2) for example.

[Math. 2]

$$vp_{sn}(t) = \min_{u}(dist(w_{sn}(t), w_{s-1n-1}(u))) \quad (2)$$

(where $1 \leq u \leq U$)

where U represents the number of words included in an utterance immediately before an estimation target utterance. The function dist represents a distance between two vectors, for which Euclidean distance, cosine distance, or the like can be used for example.

Furthermore, when a plurality of vectors which are similar to a vector obtained by performing representation conversion of an estimation target word exist in a plurality of vectors obtained by performing representation conversion of all of a plurality of words included in learning utterance information of an utterance immediately before an estimation target utterance, the estimation data generation unit 12A can also select a plurality of vectors from among the plurality of vectors obtained by performing representation conversion of all of the plurality of words included in the learning utterance information of the utterance immediately before the estimation target utterance.

In addition, the estimation data generation unit 12A obtains a vector $vc_{sn}(t)$ (second data) of an estimation target utterance (for example, the utterance 5 of the speaker 2), by using a vector obtained by performing representation conversion of an estimation target word (for example, the third word included in the utterance 5 of the speaker 2) which is included in learning utterance information of the estimation target utterance.

In addition, the estimation data generation unit 12A concatenates the vector $vp_{sn}(t)$ of the past utterances and the vector $vc_{sn}(t)$ of the estimation target utterance, thereby generating an estimation vector $v_{sn}(t)$.

The estimation data generation unit 12A can obtain the vector of the past utterances while eliminating redundant information by selecting an optimal vector and using the optimal vector from among the vectors obtained by performing representation conversion of all of the plurality of words included in the learning utterance information of the utterances prior to the estimation target utterance. This makes it possible to further enhance the estimation accuracy of the duration of an estimation target word.

According to the estimation device 100A of the second embodiment, the duration of a predetermined speech section is estimated based on the utterance information of a user by using the estimation model. This makes it possible to estimate the duration of a predetermined speech section with high accuracy.

In addition, according to the estimation device 100A of the second embodiment, the estimation data generation unit 12A generates estimation data by selecting an optimal word from among words included in utterances prior to an estimation target utterance. This makes it possible to estimate the duration of a predetermined speech section with further high accuracy also for an event such as readback in which important information is repeated.

<Modification>

In the first embodiment, for the estimation device 100 shown in FIG. 1, the learning unit 10 and the estimation unit 20 are separately described; however, the learning unit 10 and the estimation unit 20 may be integrally formed. Therefore, the estimation unit 20 may include units provided in the learning unit 10.

<Other Modifications>

The present invention is not limited to the above embodiments and modification. For example, the above various kinds of processing may be not only executed in time series according to the description but also executed in parallel or individually according to the processing capability of a device that executes the processing or according to the necessity. Various other modifications are possible without departing from the spirit of the present invention.

<Program and Recording Medium>

In addition, various processing functions in the devices described in the above embodiments and modification may be implemented by a computer. In this case, the processing contents of functions that the devices should have are described by a program. Then, by executing this program by the computer, various processing functions in each of the above devices are implemented on the computer.

The program in which this processing contents are described can be recorded in a computer-readable recording medium. As the computer-readable recording medium, for example, a non-transitory recording medium such as a magnetic recording device, an optical disk, or a magneto optical recording medium may be used.

In addition, the distribution of this program is performed by, for example, selling, transferring, or lending a portable recording medium such as a DVD or a CD-ROM in which the program is recorded. Furthermore, this program may be stored in a storage device of a server computer and transferred from the server computer to another computer via a network to distribute this program.

A computer that executes such a program, for example, first stores the program recorded in a portable recording medium or the program transferred from the server computer in its own storage unit. In executing processing, this computer reads the program stored in its own storage unit and executes the processing according to the read program. As another embodiment of this program, a computer may read the program directly from a portable recording medium and execute processing according to the program. Furthermore, each time a program is transferred from the server computer to the computer, processing according to the received program may be executed sequentially. Yet furthermore, the above-described processing may be executed by a so-called ASP (Application Service Provider) type service that implements processing functions only by execution instructions and result acquisition without transferring the program from the server computer to this computer. It should be noted that the program includes information that is provided for processing by an electronic computer and conforms to a program (such as data that is not a direct command for the computer but has a property that defines the processing of the computer).

Although each of the devices is configured by executing a predetermined program on the computer, at least part of the processing contents may be implemented by hardware.

Although the above embodiments have been described as representative examples, it will be apparent to those skilled in the art that many changes and substitutions can be made within the spirit and scope of the present invention. Therefore, the present invention should not be construed as being limited by the above-described embodiments, and various modifications and changes can be made without departing from the scope of the claims. For example, it is possible to combine a plurality of constituent blocks described in the configuration diagram of the embodiments into one, or to divide one constituent block.

REFERENCE SIGNS LIST

10 Learning unit
11 Representation conversion unit
12, 12A Estimation data generation unit
13 Estimation model learning unit
20 Estimation unit
100, 100A Estimation device

The invention claimed is:

1. An estimation device for estimating a duration of a speech section, the estimation device comprising a processor configured to execute operations comprising:
    converting representation of a plurality of words included in learning utterance information to a plurality of pieces of numeric representation data;
    generating estimation data by using a plurality of pieces of the learning utterance information and the plurality of pieces of numeric representation data;
    training an estimation model by using the estimation data and durations of the plurality of words; and
    estimating a duration of a predetermined speech section based on utterance information of a user by using the estimation model.

2. The estimation device according to claim 1, wherein the generating further comprises:
    obtaining first data of a past utterance by using the plurality of pieces of numeric representation data, the plurality of pieces of numeric representation data being obtained by performing representation conversion of a plurality of words included in learning utterance information of the past utterance, the past utterance being prior to an estimation target utterance;
    obtaining second data of the estimation target utterance by using numeric representation data, the numeric representation data being obtained by performing representation conversion of an estimation target word included in learning utterance information of the estimation target utterance; and
    generating the estimation data based on the first data and the second data.

3. The estimation device according to claim 2, wherein the generating further comprises:
    obtaining the first data by using statistics of a plurality of numeric representation data, the plurality of numeric representation data being obtained by performing representation conversion of all of a plurality of words included in learning utterance information of an utterance, the utterance being immediately before the estimation target utterance.

4. The estimation device according to claim 2, wherein the generating further comprises:
    obtaining the first data by selecting numeric representation data and uses the selected numeric representation data, the numeric representation data being most similar to numeric representation data obtained by performing representation conversion of the estimation target word, the selecting being performed from among a plurality of pieces of numeric representation data obtained by performing representation conversion of all of a plurality of words included in learning utterance information of an utterance, the utterance being immediately before the estimation target utterance.

5. The estimation device according to claim 1, wherein the estimation model includes a neural network, wherein data of the speech section includes an acoustic feature amount, and wherein the acoustic feature amount includes a pitch parameter and a spectrum parameter.

6. The estimation device according to claim 1, the converting further comprises converting the plurality of words into a plurality of vectors using a word-vector conversion model.

7. An estimation method performed by an estimation device that estimates a duration of a speech section, the method comprising:
    converting representation of a plurality of words included in learning utterance information to a plurality of pieces of numeric representation data;
    generating estimation data by using a plurality of pieces of the learning utterance information and the plurality of pieces of numeric representation data;
    training an estimation model by using the estimation data and durations of the plurality of words; and
    estimating a duration of a predetermined speech section based on utterance information of a user by using the estimation model.

8. The estimation method according to claim 7, wherein the generating further comprises:
    obtaining first data of a past utterance by using the plurality of pieces of numeric representation data, the plurality of pieces of numeric representation data being obtained by performing representation conversion of a plurality of words included in learning utterance information of the past utterance, the past utterance being prior to an estimation target utterance;

obtaining second data of the estimation target utterance by using numeric representation data, the numeric representation data being obtained by performing representation conversion of an estimation target word included in learning utterance information of the estimation target utterance; and generating the estimation data based on the first data and the second data.

9. The estimation method according to claim 8, wherein the generating further comprises:

obtaining the first data by using statistics of a plurality of numeric representation data, the plurality of numeric representation data being obtained by performing representation conversion of all of a plurality of words included in learning utterance information of an utterance, the utterance being immediately before the estimation target utterance.

10. The estimation method according to claim 8, wherein the generating further comprises:

obtaining the first data by selecting numeric representation data, and using the selected numeric representation data, the numeric representation data being most similar to numeric representation data obtained by performing representation conversion of the estimation target word, the selecting being performed from among a plurality of pieces of numeric representation data obtained by performing representation conversion of all of a plurality of words included in learning utterance information of an utterance, the utterance being immediately before the estimation target utterance.

11. The estimation method according to claim 7, wherein the estimation model includes a neural network, wherein data of the speech section includes an acoustic feature amount, and wherein the acoustic feature amount includes a pitch parameter and a spectrum parameter.

12. The estimation method according to claim 7, the converting further comprises converting the plurality of words into a plurality of vectors using a word-vector conversion model.

13. A computer-readable non-transitory recording medium storing computer-executable program instructions that when executed by a processor configured to cause a computer system to execute operations comprising:

converting representation of a plurality of words included in learning utterance information to a plurality of pieces of numeric representation data;

generating estimation data by using a plurality of pieces of the learning utterance information and the plurality of pieces of numeric representation data;

training an estimation model by using the estimation data and durations of the plurality of words; and estimating a duration of a predetermined speech section based on utterance information of a user by using the estimation model.

14. The computer-readable non-transitory recording medium of claim 13, wherein the generating further comprises:

obtaining first data of a past utterance by using the plurality of pieces of numeric representation data, the plurality of pieces of numeric representation data being obtained by performing representation conversion of a plurality of words included in learning utterance information of the past utterance, the past utterance being prior to an estimation target utterance;

obtaining second data of the estimation target utterance by using numeric representation data, the numeric representation data being obtained by performing representation conversion of an estimation target word included in learning utterance information of the estimation target utterance; and generating the estimation data based on the first data and the second data.

15. The computer-readable non-transitory recording medium of claim 14, wherein the generating further comprises obtaining the first data by using statistics of a plurality of numeric representation data, the plurality of numeric representation data being obtained by performing representation conversion of all of a plurality of words included in learning utterance information of an utterance, and the utterance being immediately before the estimation target utterance.

16. The computer-readable non-transitory recording medium of claim 14, wherein the generating further comprises:

obtaining the first data by selecting numeric representation data, and using the selected numeric representation data, the numeric representation data being most similar to numeric representation data obtained by performing representation conversion of the estimation target word, the selecting being performed from among a plurality of pieces of numeric representation data obtained by performing representation conversion of all of a plurality of words included in learning utterance information of an utterance, and the utterance being immediately before the estimation target utterance.

17. The computer-readable non-transitory recording medium of claim 13, wherein the estimation model includes a neural network, wherein data of the speech section includes an acoustic feature amount, and the acoustic feature amount includes a pitch parameter and a spectrum parameter.

18. The computer-readable non-transitory recording medium of claim 13, wherein the converting further comprises converting the plurality of words into a plurality of vectors using a word-vector conversion model.

* * * * *